United States Patent [19]

Condolios

[11] Patent Number: 4,647,372
[45] Date of Patent: Mar. 3, 1987

[54] SLUDGE BELT APPARATUS FOR CLARIFYING LIQUID CHARGED WITH SOLID MATTER

[75] Inventor: Elie Condolios, Grenoble, France
[73] Assignee: Alsthom-Atlantique, Paris, France
[21] Appl. No.: 760,853
[22] Filed: Jul. 31, 1985
[30] Foreign Application Priority Data
Jul. 31, 1984 [FR] France ............................ 84 12141
[51] Int. Cl.⁴ ............................................. B01D 21/08
[52] U.S. Cl. ................................... 210/207; 210/220; 210/512.1
[58] Field of Search ............... 210/207, 208, 219, 200, 210/201, 206, 220, 512.1

[56] References Cited

U.S. PATENT DOCUMENTS

| | | | |
|---|---|---|---|
| 2,573,941 | 11/1951 | Walker et al. | 210/208 X |
| 3,397,788 | 8/1968 | Duff et al. | 210/208 X |
| 4,346,000 | 8/1982 | van Drooge | 210/207 X |
| 4,376,045 | 3/1983 | Siskind | 210/208 X |

*Primary Examiner*—Tom Wyse
*Attorney, Agent, or Firm*—Sughrue, Mion, Zinn, Macpeak & Seas

[57] ABSTRACT

A cloudy liquid to be clarified is inserted, after twice receiving flocculation additive, into the bottom of a belt of sludge (4a) in a clarification chamber (4) via a plurality of injectors (22) distributed over the area of said chamber. Uniform distribution of overall flow between these injectors is ensured by internal head loss. The clarified liquid is removed via an upper overflow (4b).

Each injector is constituted by a flat cyclone and forms a jet which is highly diverting from its vertical axis in such a manner that the injected flowrate spreads out over an expansion zone belonging to said injector and meeting the expansion zones of adjacent injectors. Further, these jets set up swirling motion which prevents the formation of a layer of sludge having insufficient permeability. The sludge formed in the chamber (4) is directed via a central well (7) towards a secondary clarification sludge (3) situated beneath said chamber and supplying both clarified liquid and dense sludge.

7 Claims, 4 Drawing Figures

SLUDGE BELT APPARATUS FOR CLARIFYING LIQUID CHARGED WITH SOLID MATTER

The invention relates to rapid clarification of water charged with fine material in suspension.

Water to be clarified by the apparatus of the invention generally occurs at the outlet from an industrial process, and is intended, for example, either for further industrial use or else for rejection into the public water systems. However, these indications are not restrictive in any way. Although the following description refers to practical examples in which the apparatus is used with waste water from the minerals industry, the apparatus may naturally be applied to clarifying liquids with a wide variety of charges.

Heretofore, generally used methods have required relatively long periods of time to separate and sediment out solid particles in suspension and to obtain a liquid or water which is sufficiently clarified to meet the standards laid down. This arises because the settling speed does not exceed a few meters per hour. As a result it has been necessary to use separator equipment which is expensive, and of large size and volume.

It is known that in order to increase the rate at which solid particles settle it is necessary to link up the particles in suspension by adding a small quantity of additive to the cloudy liquid suitable for initiating the flocculation phenomenon. This phenomenon enables the solid particles to come together to form agglomerates or flakes of considerably greater size than the particles from which they are built up, but having an apparent density which is less than that of the solids from which they are built up.

Generally, after flocculation, the liquid and its charge of flakes of different sizes and densities is conveyed to a settling zone containing a higher concentration of flakes, thereby accelerating the increase in flake size and consequently increasing the settling speed. The flakes which have settled in the lower portion of the settling zone are concentrated and they are removed (generally continuously, but sometimes in a discontinuous manner) in the form of a sludge which is more or less concentrated depending on a suitably determined average flow rate. The clarified liquid is removed at the same time from the top of the settling device from which it merely overflows.

It is also known that the two functions of clarifying the liquid and concentrating the solid can be obtained more rapidly by separating the functions so that they take place in distinct parts of the apparatus. The apparatus is then said to have two stages. The stages may be superposed with the clarification stage being above the concentration stage, or they may be concentric, or they may be side-by-side.

It is known that the flocculation phenomenon as initiated by flocculation additives forms agglomerates whose mechanical cohesion is low, and that hydraulic movements in the clarification zone may have both advantageous and disadvantageous effects simultaneously on the structure and the physical characteristics of the agglomerates.

Speeds which are too high in some portions of the apparatus destroy the flakes already formed and form flakes having too wide a range of sizes including many very fine agglomerates which settle poorly. Speeds which are too slow in other portions of the apparatus enable flakes to form which are too big and which agglomerate with one another. These flakes then form continuous layers of low permeability which slow down the passage of the liquid to be clarified. Instability phenomena then occur with some zones being formed in which the liquid moves at high speeds that destroy the flakes.

More particularly, a known clarification method applicable to a liquid charged with fine particles comprises the following operations:

adding a flocculating additive to a cloudy liquid to cause those of said fine particles which meet one another to bind together and form flakes;

substantially continuously inserting said mixture into a distribution chamber having substantially uniform pressure and inserting said mixture into a clarification chamber via a plurality of injectors distributed over the surface of said chamber in the lower part thereof;

removing clarified liquid via a liquid removal orifice in the upper portion of said chamber; and removing sludge via a sludge-removal orifice situated further down.

The cloudy liquid injection rate is selected in such a manner as to form a belt of sludge above the injectors with the cloudy liquid rising through said belt between flakes which have already been formed, and the fine particles in said water binding to said flakes in order to increase the volume thereof so that the liquid which arrives above said belt of slude is partially clarified and forms a belt of clarified liquid above the belt of sludge.

Each of the injectors is provided with guide means.

This known method is described in French Pat. No. 2 477 896 (Ghezail et al). More particularly, it includes the following characteristics:

the injectors are injection orifices through the floor of the clarification chamber. Funnel-shaped elements flare upwardly from said orifices. In each horizontal plane passing through such a funnel, the cross-section of the passage allowed to the injected cloudy water is, according to said patent (page 5, lines 1–5), constituted by the entire interior of the funnel, thereby very rapidly reducing the speed of said water after it leaves the injection orifices. This is the desired result since in this method it is desired above all that the belt of sludge above the injection orifices should be substantially free of agitation. In practice, once the liquid passes through the injection orifice at any substantial speed, an axial cylindrical jet is formed at a distance from the walls of the funnel. Further, in this method, the sludge is partially removed on a temporary basis in a periodic manner through the injection orifices by applying temporary suction thereto and causing the flow direction through the injection orifices to be temporarily and suddenly reversed. The walls of the funnels then appear to constitute means for guiding the sludge towards the orifices. These brief periodic reversals of cloudy water flow direction prevent, to some extent, the formation of a continuous and insufficiently permeable layer which would cause the above-mentioned instability phenomena to appear.

A second known method makes it possible to avoid, to some extent, the formation of an insufficiently permeable continuous layer of sludge. This method is described in French Pat. No. 1 115 038 (Degremont) and makes use of periodic temporary accelerations in the flow of cloudy water through the injection orifices.

A third method is known from French Pat. No. 2 431 317 (Dorr Oliver) corresponding to U.S. Pat. No. 4 263 137 (Kos). This method uses moving injectors including funnel-shaped guide means which serve to slow down and distribute the flow of injected cloudy water.

A fourth known method is described in German patent specification No. 238,959 (H. Scheven).

In that method, the mixture of cloudy liquid and flocculation agent is inserted into a clarification chamber via a plurality of injectors distributed over the area of the chamber with each of the injectors forming a downwardly directed vertical jet towards a cup-shaped deflector. The deflector divides the jet and spreads it radially and upwardly, i.e. towards a sludge belt. It is specified that the association of said cups with said injectors creates "a slow uniform upward current". This method does not appear to have been developed industrially.

The object of the present invention when implementing a clarification method of the above-mentioned type, is to provide a simple manner of giving the liquid which rises through said sludge belt an increased average upwards speed and/or of treating a cloudy liquid containing an increased concentration of solid matter, while retaining effective separation with the same types of solid particle, and with the same quantity of flocculation agent relative to the mass of solid matter.

Any increase in average upwards speed gives increased flowrate of treated cloudy liquid through an installation of given area, or, when treating a given flowrate, it reduces the area required by the installation. When a high water flowrate is to be treated, such a reduction in the area of the installation constitutes a major economic advantage.

The present invention provides a sludge belt clarification apparatus for cloudy liquid charged with solid particles, said apparatus being more precisely intended to receive a liquid charged with fine particles in suspension and to provide firstly a clarified liquid and secondly a sludge, said apparatus comprising:

a clarification chamber (4);

a distribution chamber (5) extending under said clarification chamber;

means (8, 9, 11) for adding a fluocculation additive to said cloudy liquid in such a manner as to provide a mixture in which said fine particles meet one another and bind together with the aid of said additive to form flakes;

means (2) for inserting said mixture into said distribution chamber while setting up a substantially uniform pressure therein;

a plurality of injectors (22) distributed over the bottom area of the clarification chamber, each injector having an axis (22a) and being provided with guide means, and each of said injectors causing the distribution chamber to communicate with the clarification chamber for continuously inserting said mixture into the bottom of said clarification chamber with a flow which is distributed over the area of said chamber;

an orifice (4b) for continuously removing clarified liquid from the upper portion of the clarification chamber (4); and an orifice (26) for continuously removing sludge below said orifice for removing clarified liquid;

the flowrate through said injectors being chosen in such a manner as to form a belt of sludge (4a) above said injectors through which belt a mixed cloudy liquid rises between the already-formed flakes such that the fine particles still in suspension in said liquid bind to said flakes to increase the volume thereof and such that the liquid which arrives above said sludge belt is clarified and forms a layer of clarified liquid (4a);

said apparatus being characterized by the fact that each of said injectors has a substantially vertical axis (22a) and includes a cyclone chamber (22) having a generally cylindrical side wall (22d) with generator lines parallel to said axis and rotated about said axis, and with a floor and a ceiling substantially perpendicular to said axis, said chamber including an inlet (21a) fed from the said distribution chamber (5) and directed in such a manner as to inject said mixture into said chamber tangentially, said chamber also including an outlet (21) constituted by an injection hole extending coaxially through its ceiling, in such a manner as to cause said mixture to rotate in said chamber with a vortex flow about said axis while simultaneously getting progressively closer to said axis and said outlet, said outlet also constituting an inlet through the bottom of the said clarification chamber in such a manner that the said liquid mixture enters said clarification chamber in the form of a diverging jet substantially occupying a rotating conical sheet about said injector axis, and in such a manner as to provide both a head loss suitable for ensuring that the liquid flow is evenly distributed between the injectors and spreads out from each injector over an area centered on said injector outlet and much greater than said outlet, and controlled agitation of the lower layers of said sludge belt (4a), without creating excessive shear liable to break up flakes which have already been formed. (The reference signs in parentheses refer to the figures and are given merely by way of example).

Further, the following dispositions are preferably adopted, at least in some cases:

said injector hole (21) in each injector (22 has a diameter which is less than about half of the average diameter of said cyclone chamber, in such a manner as to form in said chamber a vortex type flow with increasing circumferential speed going from the outside wall (22d) towards the axis (22a) of said chamber, and to impart a horizontal circumferential speed to said divergent jet which is at least equal to its axial speed.

the pressure in said distribution chamber is chosen so that each of said cyclone chambers (22) feeding its corresponding injector hole (21) distributes liquid transversely over an area which is from 50 to 100 times greater than the area of the hole, by virtue of the fact that the angle of said divergent jets downstream from the outlet (21) from the injector (22) is on average greater than 45° to the injector axis (22a), and is preferably 60° thereto.

said inlets (21a) to the cyclone chambers (22) are oriented to create vortex movements rotating in opposite direction an an alternating manner between adjacent cyclones so as to prevent said divergent jets setting up overall rotation of the liquid in said clarification chamber (4).

the apparatus includes anti-vortex fins (15 penetrating radially into said clarification chamber (4) to prevent overall rotation in said chamber.

the ceiling (22c) of each of said cyclone chambers is constituted by a portion of a metal sheet which constitutes the floor of said clarification chamber (4).

An implementation of the invention is described in greater detail below by way of non-limiting example with reference to the accompanying diagrammatic figures. It must be understood, that without going beyond the scope of the invention, the items described and shown may be replaced by other items providing the same technical functions. When the same item is shown in several figures, it is designated by the same reference sign in all of them.

Figure 1:
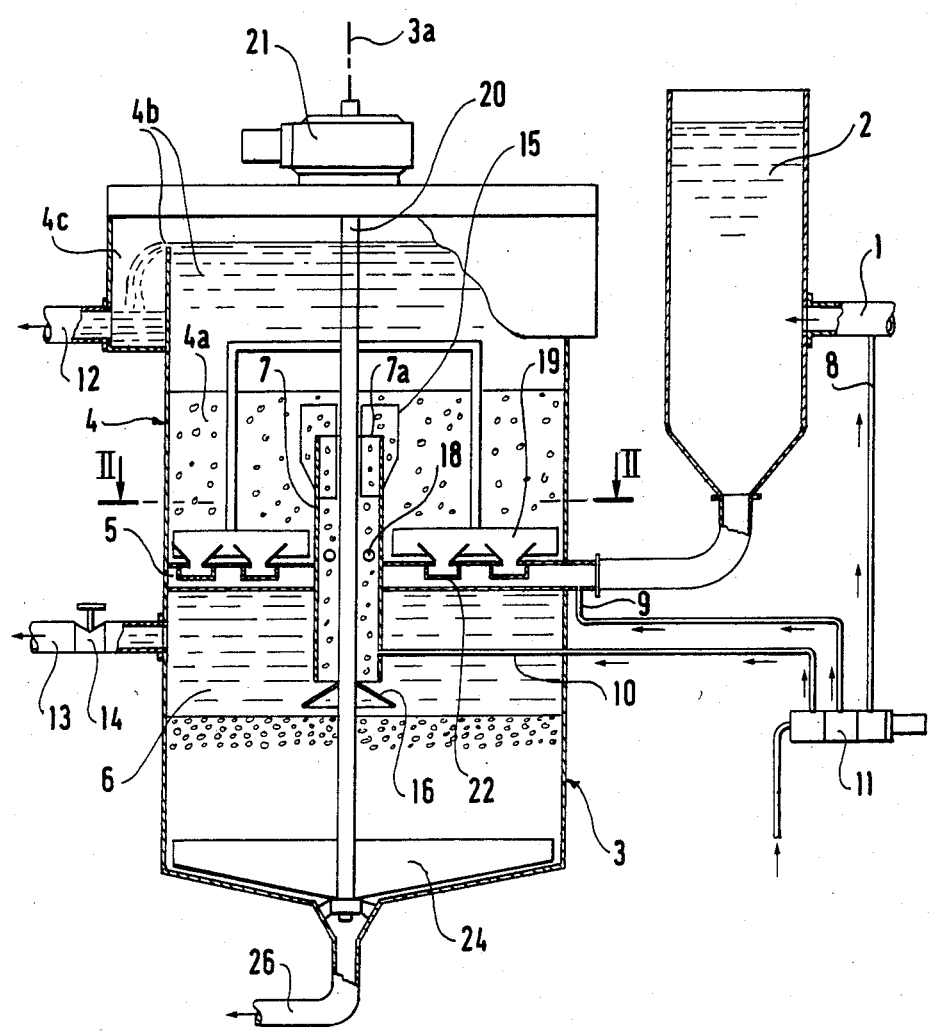
FIG. 1 is a view of apparatus for performing the invention shown in section of a plane I—I of FIG. 2, said plane passing through the vertical axis of the apparatus.

With reference to FIG. 1, the cloudy liquid constituted by water charged with solid material in suspension (e.g. clay from phosphate washing) is inserted via a duct 1 into a primary flocculating tank 2 for feeding a clarifying and settling apparatus 3.

This clarifying and settling apparatus has a vertical axis 3a and is mainly constituted by a cylindrical tank 3a within which are two superposed and generally cylindrical stages. An upper primary stage 4 constitutes the said clarification chamber. It has a circular threshold 4b which constitutes the said water removal orifice over the top of tank 3a which the water overflows. Its bottom end is delimited by a chamber 5 which constitutes the said distribution chamber and which separates the upper stage 4 from the lower secondary stage 6.

The bottom of the upper primary stage 4 is shown to be horizontal in shape. It could also be conical with a downwardly directed point without interfering with the operation of the apparatus.

The chamber 5 located between the two stages 4 and 6 serves to feed the sludge belt 4a which forms in the lower portion of the upper stage and within which secondary flocculation takes place thereby forming agglomerates or flakes which settle and are concentrated in the lower stage 6.

The chamber 5 is fitted with injectors which are described more accurately below with reference to FIGS. 2 and 3.

The upper primary stage 4 and the lower secondary stage 6 are hydraulically interconnected by a cylindrical tube forming central well 7 which opens out at 7a into the thickness of the sludge belt and which serves to pass the flakes made up in said sludge belt from the primary stage into the lower secondary stage where they settle and are concentrated.

Various commercially available flocculation additives may be used for forming the agglomerates, including various polymers, provided that the flocculating agent used is properly matched to the solid materials to be settled out and to the characteristics of the liquid to be clarified.

The flocculation additive used is diluted to the proper concentration to obtain maximum effect and it is generally injected into the apparatus via two or three points.

As can be seen in FIG. 1, a first dose of additive is inserted via pipe 8 prior to insertion of the water to be clarified in the tank 2 in order to trigger primary flocculation in said tank causing small flakes to be formed, having a size of less than 1 mm to 2 mm.

After the flocculation, a second dose of additive is inserted via pipe 9 at the inlet to the distribution chamber 5 which also serves as a mixing chamber.

Secondary flocculation takes place in the sludge belt 4a in the upper primary stage 4. Generally these two primary flocculation stages are sufficient, but some types of particle may need a third dose of the same additive via pipe 10 a point located at the bottom of the well 7 prior to entry into the lower stage 6. Sometimes the additive inserted via pipe 10 may be of a different kind since it may be an additive for accelerating the concentration of flakes in stage 6. The various quantities of additive from a source indicated by arrow A inserted are measured out by a multi-head metering pump 11 or by two pumps of the same type where different additives are used.

Both stages of the apparatus provide clarified liquid: the upper stage causes it to overflow and be removed via an annular channel 4c and a pipe 12, while the lower stage 6 removes it via a pipe 13. This pipe 13 is provided with a valve or other hydraulic adjustment device 14 in order to adjust the proportions of clarified liquid which leave the primary stage via the pipe 12 and the secondary stage via the pipe 13.

Generally, the flowrate of clarified liquid produced by the primary stage is practically equal to the flowrate produced by the secondary stage. This ratio may be modified if it is desired to improve the quality of the clarification of the liquid by increasing the proportion of secondary flowrate to primary flowrate, which ratio may be as great as two.

In order to improve the stability of the sludge belt 4a in the primary stage 4, the central well 7 is fitted with a plurality of anti-vortex fins 15.

Further, in order to improve the distribution of cloudy liquid passing through the well 7 and feeding the lower stage 6, the bottom portion of the well 7 is fitted with a conically shaped deflector 16.

The well 7 is not only open at its top 7a within the thickness of the sludge belt 4a, but it is also perforated one or more holes 18 located near to the bottom of the upper stage 4 in order to put the bottom of the sludge belt into direct communication with the well. This disposition allows a small portion of the cloudy liquid, at a given flowrate, contained in the sludge belt 4a to be passed directly into the well 7, with the major portion overflowing the top of the well 7 prior to dropping towards the stage 6. This disposition has the advantage of causing agglomerates which have grown too much to rise up to the top of the well 7 to pass directly therein.

In order to facilitate removal of large agglomerates through the holes 18, slowly rotating scraper blades 19 urge these large agglomerates by a centripetal mechanical effect towards the holes into the well for their removal. These blades are controlled by a control shaft 20 driven by a motor and gearbox unit 21. The same shaft 20 also controls scraper blades 24 which rotate at the same speed to remove concentrated sludge from the bottom of the secondary stage 6 for hydraulic removal via a pipe 26.

Figure 2:
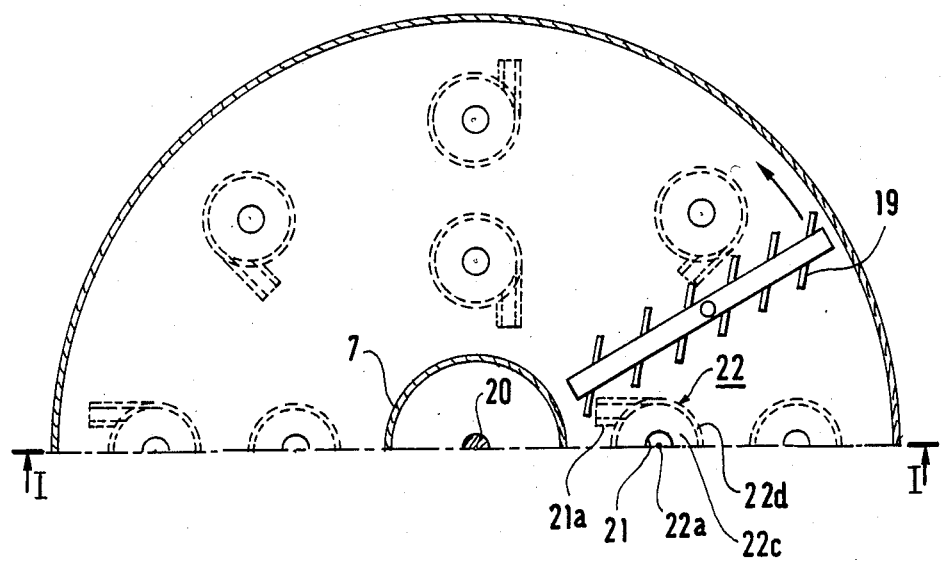
FIG. 2 is a horizontal section through said apparatus on a plane II—II of FIG. 1, and on a larger scale.
Figure 3:
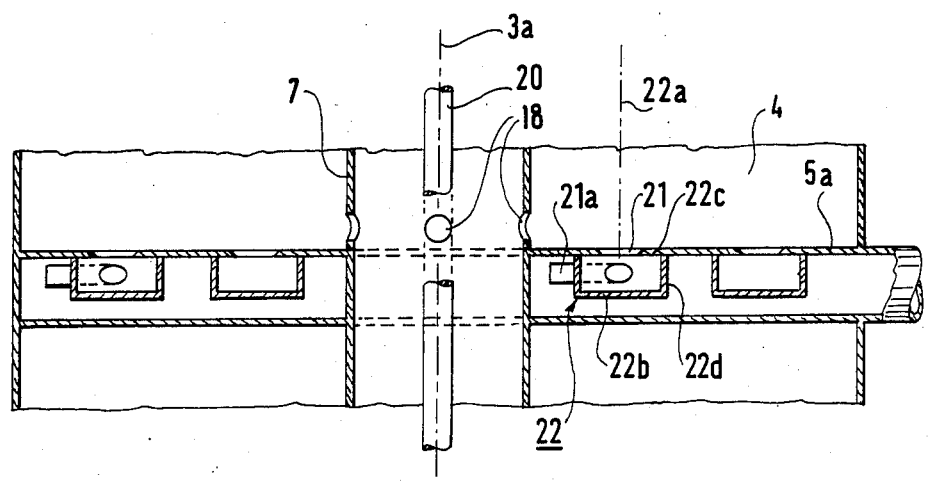
FIG. 3 shows a detail of FIG. 1 to the same larger scale.

FIG. 3 is a section on a larger scale through the distribution chamber 5 and its injectors, and FIG. 2 is a plan view showing some of said injectors.

As mentioned above, essential parameters for proper operation of clarification apparatus are the formation of the agglomerates, the uniformity of their size, and their density.

In order to reach the desired object of the present invention, it is necessary to distribute as uniformly as possible the flowrate of liquid to be clarified over the entire transverse area of the apparatus, i.e. the rising flow speeds through the sludge belt 4a contained in the chamber 4 should be as uniform as possible.

For this purpose, as shown in FIG. 3, the primary clarification stage 4 is delimited at its bottom end by a chamber 5 whose top is constituted by a partition 5a which constitutes the floor of the clarification chamber 4 and which is pierced by injector holes distributed over its area partition 5a overlying and spaced from a bottom partition 5b. These holes 21 inject into said chamber the liquid to be clarified after it has already received both its primary and secondary doses of flocculation additive.

Each hole 21 constitutes the outlet from a flat cyclone chamber 22 which sets up a swirling motion so as to spread out the liquid to be clarified on leaving each hole 21 over an area which is 40 to 100 times greater than the area of each hole.

As can be seen in FIG. 2, each flat cyclone chamber 22 has a tangential inlet tube 21a in order to set up swirling motion in said chamber, which motion continues through the holes 21 and into the bottom of the sludge belt 4a, thereby uniformly distributing the liquid to be clarified and uniformly mixing the flocculation agents therein.

Figure 4:
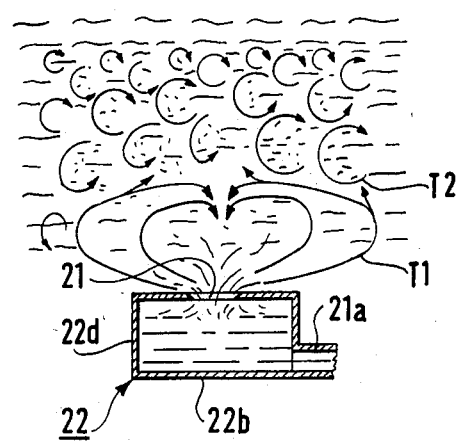
FIG. 4 is a highly diagrammatic representation of the turbulence created in the sludge belt by an injector.

Each of these flat cyclone chamber 22 together with its outlet hole 21 and its inlet 21a constitutes one of said injectors, having a vertical axis 22a and setting up primary swirling motion of the type mentioned above. This swirling motion is represented at T1 in FIG. 4. It reaches the edge of the expansion zone 22b of the injector. It then returns towards the axis of said injector and a falling current appears on said axis. This sets up secondary swirling motions such as T2 thereabove and these in turn set up further swirling motion. There is thus substantial agitation in the lower portion of the sludge belt. This agitation falls off with increasing height, and the top layer of the sludge belt is hardly agitated at all.

Further, as can be seen in FIG. 2, the tangential inlets to the cyclones are placed in alternating manner with clockwise and counter-clockwise swirling motions cancelling one another to avoid an overall swirling motion in the chamber 4.

In order to show the advantages of the invention and by way of example, a two-stage 1 m diameter apparatus feeding its sludge belt by means of a conventional slot system clarifies 16 to 18 m³/n of clayey water having a concentration of 30 to 40 grams/liter of solid materials, whereas an apparatus of the type described above in accordance with the invention and of the same size is capable of clarifying a flowrate of 70 to 80 m³/n with the same consumption of flocculating agent per ton of settled dry matter, i.e. 90 to 100 grams of flocculating agent per metric ton.

The test apparatus was fitted with about fifty cyclone injectors for feeding the sludge belt, each injector having an outlet hole into the sludge belt with a diameter of 20 mm.

I claim:

1. In a sludge belt clarification apparatus for cloudy liquid charged with solid particles, said apparatus comprising:
   a vertically upright tank, a source of cloudy liquid, mixing means (8, 9, 11) for providing a mixture of a floculation additive in said cloudy liquid;
   said tank including partition means forming a distribution chamber (5) and defining a clarification chamber 4 above said distribution chamber;
   feeding means (2) for feeding said distribution chamber with said mixture;
   a plurality of injectors (22) distributed over the bottom of the clarification chamber for injecting said mixture thereinto from said distribution chamber,
   said feeding means constituting means for setting up in said distribution chamber a sludge belt (4a) in said clarification chamber whereby said mixture rises between the readily already formed flakes of said belt and particles from said mixture bind to said flakes with the help of said floculation additive;
   an orifice (4b) above said sludge belt for continuously removing clarified liquid from said clarification chamber (4); and
   an orifice (26) in communication with said sludge belt for continuously removing sludge from said sludge belt;
   the improvement wherein each of said injectors has a substantially vertical axis (22a) and constitutes a cyclone chamber (22) having a cylindrical side wall (22d), a floor and a ceiling, said cyclone chamber including a tangential inlet (21a) within said distribution chamber (5a) for causing rotation of said mixture within said cyclone chamber, said cyclone chamber also including an outlet central injection hole (21) through its ceiling for forming a vortes flow path in said cyclone chamber and for injecting a diverging jet of said mixture into said clarification chamber, said injectors providing at the same time a head loss for evenly distributing the flow of said mixture between the injectors, spreading of said mixtures from each injector, and moderate agitation of the lower layers of said sludge belt (4a).

2. Apparatus according to claim 1, wherein said injection hole (21) in each injector (22) has a diameter which is less than about half of the diameter of said cyclone chamber.

3. Apparatus according to claim 1, wherein said feeding means in said distribution chamber comprises means for creating a pressure within each of said cyclone chamber (22) feeding its corresponding injection hole (21) such that said injection hole distributes liquid transversely over an area which is from 50 to 100 times greater than the area of the hole.

4. Apparatus according to claim 1, wherein said feeding means in said distribution chamber comprises means for creating a pressure within each cyclone chamber (22) such that the angle of said divergent jet downstream from the outlet (21) of the injector (22) is on average greater than 45° to the injector axis (22a).

5. Apparatus according to claim 1, wherein said inlets (21a) to the cyclone chambers (22) comprise inlets oriented to rotate said mixture in opposite directions in adjacent cyclone chambers.

6. Apparatus according to claim 5, further including a vertical cyclindrical tube projecting through the center of said clarification chamber and anti-vortex fins (15) fixed to the cylindrical tube and penetrating radially into said clarification chamber (4).

7. Apparatus according to claim 1, wherein the partitions means comprises the floor of said clarification chamber (4) and the ceiling (22c) of each of said cyclone chambers is a respective portion of the clarification chamber (4) floor.

* * * * *